(12) United States Patent
Anwyl et al.

(10) Patent No.: US 10,225,122 B2
(45) Date of Patent: Mar. 5, 2019

(54) LOW PAPR DUAL SUB-CARRIER MODULATION SCHEME FOR BPSK IN WLAN

(71) Applicant: MEDIATEK INC., Hsinchu (TW)

(72) Inventors: Gary A. Anwyl, Palo Alto, CA (US); Jianhan Liu, San Jose, CA (US); Tianyu Wu, Fremont, CA (US); Thomas Edward Pare, Jr., Mountain View, CA (US)

(73) Assignee: MEDIATEK INC., Hsin-Chu (TW)

( * ) Notice: Subject to any disclaimer, the term of this patent is extended or adjusted under 35 U.S.C. 154(b) by 36 days.

(21) Appl. No.: 15/422,755

(22) Filed: Feb. 2, 2017

(65) Prior Publication Data
US 2017/0230220 A1    Aug. 10, 2017

Related U.S. Application Data

(60) Provisional application No. 62/291,038, filed on Feb. 4, 2016.

(51) Int. Cl.
*H04L 27/26* (2006.01)
*H04L 1/00* (2006.01)
*H04W 84/12* (2009.01)

(52) U.S. Cl.
CPC ........ *H04L 27/2618* (2013.01); *H04L 1/0003* (2013.01); *H04L 1/0057* (2013.01); *H04L 1/0059* (2013.01); *H04W 84/12* (2013.01)

(58) Field of Classification Search
CPC . H04L 27/2618; H04L 1/0003; H04L 1/0057; H04L 1/0059; H04W 84/12
See application file for complete search history.

(56) References Cited

U.S. PATENT DOCUMENTS

| 7,126,533 | B2 | 10/2006 | Fiore et al. |
| 8,213,527 | B2 | 7/2012 | Wang et al. |
| 8,619,641 | B2 | 12/2013 | Guo |
| 8,929,192 | B2 | 1/2015 | Kainulainen et al. |

(Continued)

FOREIGN PATENT DOCUMENTS

| CN | 102149192 | 8/2011 |
| EP | 3098999 | 11/2016 |

(Continued)

OTHER PUBLICATIONS

EPO, Search Report for the EP patent application 17154548.6 dated Jun. 30, 2017 (7 pages).

(Continued)

*Primary Examiner* — Duc C Ho

(57) ABSTRACT

Dual sub-carrier modulation (DCM) is introduced in high efficiency (HE) WLAN. DCM is a solution to deal with narrow band interferences and for range extension. DCM can introduce frequency diversity into OFDM systems by transmitting the same information on two subcarriers separated in frequency. If DCM is applied, then the transmitter modulates the same encoded bits onto two separated subcarriers with the same or different constellation mapping schemes. DCM suffers from a high peak-to-average power ratio (PAPR). In accordance with one novel aspect, a method of transmitting and encoding a HE PPDU frame with binary phase shift keying (BPSK) DCM and lower PAPR is proposed.

16 Claims, 4 Drawing Sheets

(56) References Cited

U.S. PATENT DOCUMENTS

| | | | |
|---|---|---|---|
| 9,615,214 | B2 | 4/2017 | Syrjarinne et al. |
| 9,647,868 | B2 | 5/2017 | Jiao et al. |
| 2001/0006540 | A1 | 7/2001 | Kim et al. |
| 2006/0158374 | A1 | 7/2006 | Rahamin et al. |
| 2008/0191941 | A1 | 8/2008 | Saban et al. |
| 2008/0232485 | A1 | 9/2008 | Niu et al. |
| 2009/0122890 | A1 | 5/2009 | Wu |
| 2010/0246720 | A1 | 9/2010 | Wang et al. |
| 2011/0033004 | A1 | 2/2011 | Wang et al. |
| 2011/0193739 | A1 | 8/2011 | Strauch et al. |
| 2011/0243197 | A1 | 10/2011 | Atarashi et al. |
| 2011/0261858 | A1* | 10/2011 | Baldemair ........... H04J 11/0033 375/130 |
| 2011/0274003 | A1 | 11/2011 | Pare, Jr. et al. |
| 2012/0258669 | A1 | 10/2012 | Honkanen et al. |
| 2012/0263211 | A1* | 10/2012 | Porat ..................... H04L 5/0044 375/219 |
| 2013/0070701 | A1 | 3/2013 | Merlin et al. |
| 2013/0089121 | A1* | 4/2013 | Koo ....................... H04L 27/06 375/150 |
| 2013/0265907 | A1 | 10/2013 | Kim et al. |
| 2013/0321209 | A1 | 12/2013 | Kalliola et al. |
| 2013/0343211 | A1 | 12/2013 | Liu et al. |
| 2014/0070996 | A1 | 3/2014 | Kneckt et al. |
| 2014/0219449 | A1 | 8/2014 | Shattil et al. |
| 2014/0254648 | A1 | 9/2014 | Van Nee |
| 2014/0328335 | A1 | 11/2014 | Zhang |
| 2015/0009894 | A1 | 1/2015 | Vermani et al. |
| 2015/0023449 | A1 | 1/2015 | Porat et al. |
| 2015/0124739 | A1 | 5/2015 | Baik et al. |
| 2015/0139091 | A1 | 5/2015 | Azizi et al. |
| 2015/0139115 | A1 | 5/2015 | Seok |
| 2015/0230231 | A1 | 8/2015 | Fornoles, Jr. |
| 2015/0296516 | A1 | 10/2015 | Jung |
| 2016/0021568 | A1 | 1/2016 | Yu et al. |
| 2016/0033614 | A1 | 2/2016 | Wang et al. |
| 2016/0047885 | A1 | 2/2016 | Wang et al. |
| 2016/0065467 | A1 | 3/2016 | Wu et al. |
| 2016/0248542 | A1 | 8/2016 | Liu et al. |
| 2016/0249165 | A1 | 8/2016 | Aldana |
| 2016/0323060 | A1 | 11/2016 | Hassanin et al. |
| 2016/0330055 | A1 | 11/2016 | Tong |
| 2016/0352552 | A1 | 12/2016 | Liu et al. |
| 2016/0366548 | A1 | 12/2016 | Wang et al. |
| 2016/0370450 | A1 | 12/2016 | Thorn et al. |
| 2017/0064718 | A1 | 3/2017 | Bharadwaj et al. |
| 2017/0070893 | A1 | 3/2017 | Wang et al. |
| 2017/0070998 | A1 | 3/2017 | Wu et al. |
| 2017/0093546 | A1 | 3/2017 | Wu et al. |
| 2017/0099089 | A1 | 4/2017 | Liu et al. |
| 2017/0104553 | A1* | 4/2017 | Liu ........................ H04L 1/0041 |
| 2017/0134207 | A1 | 5/2017 | Liu et al. |
| 2017/0171363 | A1* | 6/2017 | Sun ........................ H04L 69/22 |
| 2017/0171796 | A1 | 6/2017 | Wu et al. |
| 2017/0180177 | A1 | 6/2017 | Wu et al. |
| 2017/0214507 | A1 | 7/2017 | Kang et al. |
| 2017/0215087 | A1 | 7/2017 | Amizur et al. |
| 2017/0230981 | A1 | 8/2017 | Ryu et al. |
| 2018/0013527 | A1 | 1/2018 | Sun et al. |

FOREIGN PATENT DOCUMENTS

| | | |
|---|---|---|
| WO | 2004049498 | 6/2004 |
| WO | 2010022785 | 3/2010 |
| WO | 2015069811 | 5/2015 |
| WO | 2015077042 | 5/2015 |
| WO | 2016178534 | 11/2016 |
| WO | 2017003229 | 1/2017 |
| WO | 2017027479 | 2/2017 |
| WO | 2017035235 | 3/2017 |

OTHER PUBLICATIONS

Jianhan Liu et al., Reliable Dual Sub-Carrier Modulations (DCM) for HE-SIG-B and Data, Sep. 12, 2015, doc.: IEEE 802.11-15/1068r1, *pp. 11-12* *pp. 16, 18*.

Robert Stacey, Specification Framework for TGax, Jan. 21, 2016, doc.: IEEE 802.11-15/013214, *p. 23, section 3.3.3* *p. 24, section 3.3.4*.

Richard van Nee, 5G Out look—Innovations and Applications: Chapter 12—802.11ax for 5G, May 15, 2016, *pp. 179-193* *p. 190, lines 5-10*.

Darryn Lowe et al., "Analysis and Evaluation of MB-OFDM Dual Carrier Modulation", Telecommunicatins Information Technology Research Institute, University of Wollongong.

EPO, Search Report for the EP Patent Application 15833049.8 dated Feb. 16, 2018 (9 pages).

International Search Report and Written Opinion of International Search Authority for PCT/CN2015/087365 dated Nov. 24, 2015 (10 Pages).

EPO, Search Report for the EP Patent Application 16191047.6 dated Feb. 14, 2017 (7 Pages).

EPO, Search Report for the EP Patent Application 16187569.5 dated Jan. 23, 2017 (12 Pages).

EPO, Search Report for the EP Patent Application 16193438.5 dated Mar. 17, 2017 (9 Pages).

EPO, Search Report for the EP Patent Application 16197315.1 dated Mar. 31, 2017 (8 Pages).

Young Hoon Kwon, Newracom, SIG Field Design Principle for 11AZ, DOC.: IEEE 802.11-15/0344R2, Mar. 2015 *Slides 5-14*.

Robert Stacey, Intel, Specification Framework for TGAX, IEEE P802.11 Wireless Lans, Jul. 2015 *p. 3, Line 25-39*, *p. 4, Line 1-5*, *Sections 3.2.2, 3.2.3, 3.3.2, 4.1*.

Katsuo Yunoki, KDDI R&D Laboratories, Considerations on HE-SIG-A/B, DOC.: IEEE 802.11-15/827R2, Jul. 2015 *Slides 2-11*.

Joonsuk Kim, et al., HE-SIG-B Structure, DOC: IEEE 802.11-15/0821R2, Sep. 2015 *Slides 11-15*.

Joonsuk Kim, Apple, HE-SIG-B Structure, DOC.: IEEE 802.11-15/0821R2, Jul. 2015 *Slides 8-15*.

Kaushik Josiam et al., HE-SIG-B Contents, DOC: IEEE802.11-15/1066R0, Sep. 2015, *Slide 8* *Slides 10, 11* *Slide 17*.

M. Rahaim et al., Wife PHY Standards Review—From Early 802.11 to 'AC' and 'AD', MCL Technical Report No. Apr. 29, 2014.

Robert Stacey, Intel, Specification Framework for TGAX, IEEE P802.11 Wireless LANS, DOC.: IEEE 802.11-15/0132R8, Sep. 2015. *Paragraph [3.2.4]*.

Tim Schmidt, "Clause 6 OFDM PHY Draft", Jan. 2010 IEEE P802.15-10-0013-00-004G, IEEE P802.15 Wireless Personal Area Networks, Progect IEEE P802.15 Working Group for Wireless Personal Area Networks (WPANS).

EPO, Search Report for the EP Patent Application 16187569.5 dated Nov. 9, 2017(6 Pages).

* cited by examiner

LOW PAPR DUAL SUB-CARRIER MODULATION SCHEME FOR BPSK IN WLAN

CROSS REFERENCE TO RELATED APPLICATIONS

This application claims priority under 35 U.S.C. § 119 from U.S. Provisional Application No. 62/291,038, entitled "Low PAPR Dual-Sub-Carrier Modulation Scheme for BPSK," filed on Feb. 4, 2016, the subject matter of which is incorporated herein by reference.

TECHNICAL FIELD

The disclosed embodiments relate generally to wireless network communications, and, more particularly, to for dual subcarrier modulation (DCM) and peak-to-average power ratio (PAPR) reduction in wireless communications systems.

BACKGROUND

IEEE 802.11 is a set of media access control (MAC) and physical layer (PHY) specifications for implementing wireless local area network (WLAN) communication in the Wi-Fi (2.4, 3.6, 5, and 60 GHz) frequency bands. The 802.11 family consists of a series of half-duplex over-the-air modulation techniques that use the same basic protocol. The standards and amendments provide the basis for wireless network products using the Wi-Fi frequency bands. For example, IEEE 802.11ac is a wireless networking standard in the IEEE 802.11 family providing high-throughput WLANs on the 5 GHz band. Significantly wider channel bandwidths (20 MHz, 40 MHz, 80 MHz, and 160 MHz) were proposed in the IEEE 802.11ac standard. The High Efficiency WLAN study group (HEW SG) is a study group within IEEE 802.11 working group that will consider the improvement of spectrum efficiency to enhance the system throughput in high-density scenarios of wireless devices. Because of HEW SG, TGax (an IEEE task group) was formed and tasked to work on IEEE 802.11ax standard that will become a successor to IEEE 802.11ac. Recently, WLAN has seen exponential growth across organizations in many industries.

Orthogonal Frequency Division Multiple Access (OFDMA) is introduced in HE WLAN to enhance the user experiences by assigning subsets of subcarriers to different users, allowing simultaneous data transmission by several users. In OFDMA, each user is assigned with a group of subcarriers called a resource unit (RU). In HE WLAN, a wireless station (STA) can transmit one minimum size RU (which is about 2 MHz bandwidth) in uplink and downlink OFDMA. Compared to its 20 MHz preamble, the power density of its data portion is 9 dB higher than its preamble. This narrow band uplink OFDMA signal is hard to be detected by CCA because CCA is operated on bandwidth that is greater or equal to 20 MHz. Therefore, one STA can experience 9 dB higher interferences on subcarriers in a particular narrow band than other subcarriers. It can be seen that narrow band interference is intrinsic in HE WLAN. A scheme to deal with such narrow band interference is needed.

In Multi-User (MU) transmissions, performance of HE-SIG-B is encoded using 1× symbol duration. As a result, its performance is worse than data symbol with 4× symbol duration when used the same modulation and coding scheme (MCS). A more robust modulation scheme is needed for HE-SIGB. In addition, to extend the range for outdoor scenarios, a new modulation scheme that can operate at lower SNR than MCS0 is also desired.

Dual Sub-Carrier Modulation (DCM) modulates the same information on a pair of subcarriers. DCM can introduce frequency diversity into OFDM systems by transmitting the same information on two subcarriers separated in frequency. DCM can be implemented with low complexity and provide better performance than existing modulation schemes used in WLAN. DCM enhances the reliability transmissions, especially under narrow band interferences. The data field of an HE PPDU can be encoded using either the binary convolutional code (BCC) or the low-density parity check (LDPC) code. The encoder is selected by the Coding field in HE-SIG-A of the HE PPDU.

While DCM has a significant diversity improvement in multi-path fading channel, it suffers from a high peak-to-average power ratio (PAPR). A solution for reducing PAPR under DCM is sought.

SUMMARY

Dual sub-carrier modulation (DCM) is introduced in high efficiency (HE) WLAN. DCM is a solution to deal with narrow band interferences and for range extension. DCM can introduce frequency diversity into OFDM systems by transmitting the same information on two subcarriers separated in frequency. If DCM is applied, then the transmitter modulates the same encoded bits onto two separated subcarriers with the same or different constellation mapping schemes. DCM suffers from a high peak-to-average power ratio (PAPR). In accordance with one novel aspect, a method of transmitting and encoding a HE PPDU frame with binary phase shift keying (BPSK) DCM and lower PAPR is proposed. In one embodiment, a first BPSK modulation scheme is applied to map encoded bits of a data packet onto lower subcarriers; a second BPSK modulation scheme is applied to map the same encode bits of the data packets onto upper subcarriers. The first and the second BPSK modulation schemes are designed such that a low PAPR is achieved. In one example, the first set of modulated symbols is represented by $s_n$ and the second set of modulated symbols is represented by $s_m$, where n and m are subcarrier indices, and $s_m = s_n * e^{j*(pi)*m}$.

In one embodiment, a wireless source station encodes data information to be transmitted from the source station to a destination station over a resource unit (RU) in an orthogonal frequency division multiplexing (OFDM) wireless local area network. The source station modulates encoded bits to a first set of modulated symbols using a first BPSK modulation scheme, wherein the first set of modulated symbols is mapped onto a first half of frequency subcarriers of the RU. The source station modulates the same encoded bits to a second set of modulated symbols using a second BPSK modulation scheme if dual carrier modulation (DCM) is applied, wherein the second set of modulated symbols is mapped onto a second half of frequency subcarriers of the RU. The source station transmits a data packet containing the modulated symbols to the destination station.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
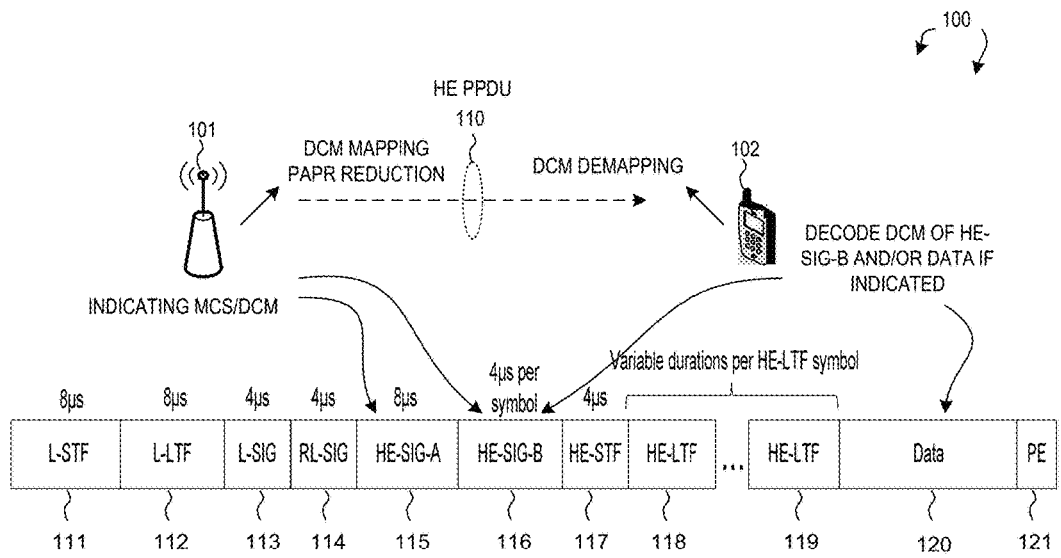
FIG. 1 illustrates a wireless communications system and a high efficiency HE PPDU frame structure supporting DCM transmission with PAPR reduction in accordance with a novel aspect.

FIG. 1 illustrates a wireless communications system 100 and a high efficiency HE PPDU frame structure supporting dual carrier modulation (DCM) with peak to average power ratio (PAPR) reduction in accordance with a novel aspect. Wireless communications network 100 comprises a wireless access point AP 101 and a wireless station STA 102. In wireless communications systems, wireless devices communicate with each other through various well-defined frame structures. A frame comprises a Physical Layer Convergence Procedure (PLCP) Protocol Data Unit (PPDU), a frame header, and a payload. Frames are in turn divided into very specific and standardized sections. In FIG. 1, a high efficiency (HE) PPDU frame 110 is transmitted from AP 101 to STA 102. HE PPDU 110 comprises a legacy short training field (L-STF 111), a legacy long training field (L-LTF 112), a legacy signal field (L-SIG 113), a repeat legacy signal field (RL-SIG 114), a HE signal A field (HE-SIG-A 115), a HE signal B field (HE-SIG-B 116), a HE short training field (HE-STF 117), a HE long training field for data (HE-LTF 118), HE-data payload 120, and a Packet Extension (PE) 121.

Orthogonal Frequency Division Multiple Access (OFDMA) is introduced in HE WLAN to enhance the user experiences by assigning subsets of subcarriers to different users, allowing simultaneous data transmission by several users. In OFDMA, each user is assigned with a group of subcarriers called a resource unit (RU). In HE WLAN, an STA can transmit one minimum size RU (which is about 2 MHz bandwidth) in uplink OFDMA. Compared to its 20 MHz preamble, the power density of its data portion is 9 dB higher than its preamble. This narrow band uplink OFDMA signal is hard to be detected by CCA. Therefore, one STA can experience 9 dB higher interferences on subcarriers in a particular narrow band than other subcarriers. It can be seen that narrow band interferences are intrinsic in HE WLAN. A scheme to deal with the narrow band interferences is thus needed. In addition, under dense deployment, robustness with narrow-band interference is important to HE WLAN. Enhancing the PER performance of HE-data portion can extend the range for outdoor scenarios. A new modulation scheme for HE-data that can operate at lower SNR than MCSO is also desired. Similarly, a more robust modulation scheme is needed for HE-SIG-B.

Accordingly, dual sub-carrier modulation (DCM) is introduced in HE WLAN. DCM is a perfect solution to deal with narrow band interferences. DCM can introduce frequency diversity into OFDM systems by transmitting the same information on two subcarriers separated in frequency. For single user transmission, the DCM scheme modulates the same information on a pair of subcarrier n and m, i.e., $0<n<N_{SD}/2$ and $m=N_{SD}/2+n$, where $N_{SD}$ is total number of subcarriers in one resource unit. For OFDMA transmissions, one frequency resource block is assigned to a given user. The DCM schemes for the one frequency block is the same as OFDM case for single user. A DCM indication scheme can be applied such that encoding and decoding of DCM is really simple. As depicted in FIG. 1, HE SIG-A 115 or HE SIG-B 116 comprises an MCS sub-field indicating the MCS and a DCM bit indicating whether DCM is applied for the subsequent HE SIG-B 116 or subsequent data payload 120 for that user. If DCM is applied and indicated, then the transmitter AP 101 modulates the same encoded bits of HE PPDU 110 on two separated subcarriers with different mapping schemes. At the receiver side, STA 102 receives HE PPDU 110, decodes the MCS and DCM indication bit, and performs demodulation and decoding accordingly.

The transmit signals in an OFDM system can have high peak values in the time domain since many subcarrier components are added via an Inverse Fast Fourier Transformation (IFFT) operation. As a result, OFDM system are known to have a high peak-to-average power ratio (PAPR) when compared to single-carrier systems. When DCM is applied, while it has a significant diversity improvement in multi-path fading channel, it suffers from a high PAPR. In accordance with one novel aspect, the modulation and mapping schemes for the dual subcarriers under DCM are selected to reduce PAPR.

Figure 2:
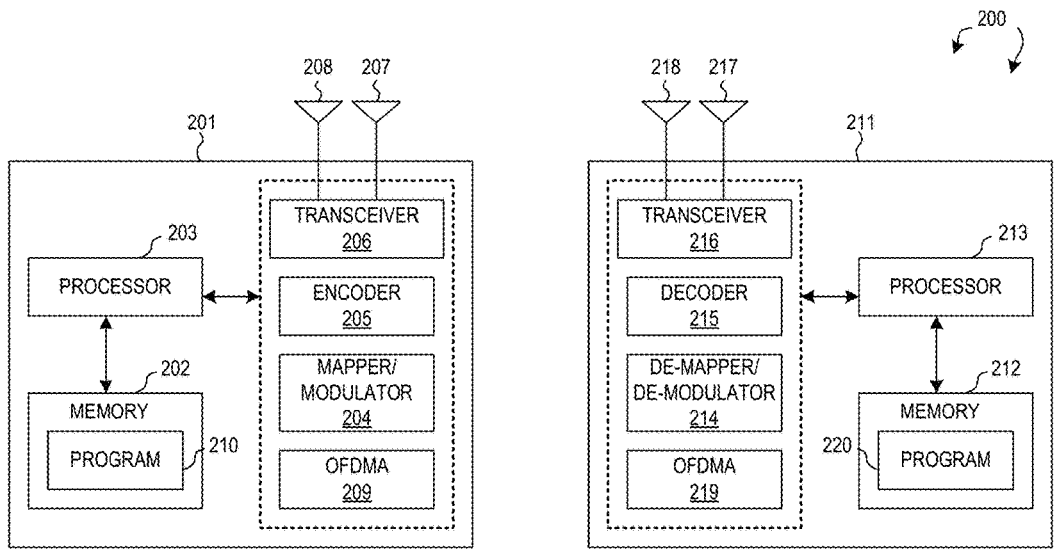
FIG. 2 is a simplified block diagram of a wireless transmitting device and a receiving device in accordance with a novel aspect.

FIG. 2 is a simplified block diagram of wireless devices 201 and 211 in accordance with a novel aspect. For wireless device 201 (e.g., a transmitting device), antennas 207 and 208 transmit and receive radio signal. RF transceiver module 206, coupled with the antennae, receives RF signals from the antennas, converts them to baseband signals and sends them to processor 203. RF transceiver 206 also converts received baseband signals from the processor, converts them to RF signals, and sends out to antennas 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a receiving device), antennas 217 and 218 transmit and receive RF signals. RF transceiver module 216, coupled with the antennae, receives RF signals from the antennas, converts them to baseband signals and sends them to processor 213. The RF transceiver 216 also converts received baseband signals from the processor, converts them to RF signals, and sends out to antennas 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a transmitting device that includes an encoder 205, a symbol mapper/modulator 204, and an OFDMA module 209. Wireless device 211 is a receiving device that includes a decoder 215, a symbol de-mapper/de-modulator 214, and a OFDMA module 219. Note that a wireless device may be both a transmitting device and a receiving device. The different functional modules and circuits can be implemented and configured by software, firmware, hardware, and any combination thereof. The function modules and circuits, when executed by the processors 203 and 213 (e.g., via executing program codes 210 and 220), allow transmitting device 201 and receiving device 211 to perform embodiments of the present invention.

In one example, at the transmitter side, device 201 generates a HE PPDU frame, and inserts both MCS and DCM indication bit in a signal field of the HE PPDU frame. Device 201 then applies corresponding MCS and DCM and transmits the HE PPDU to the receiver. At the receiver side, device 211 receives the HE PPDU, and decodes the MCS and DCM indication bit. If the DCM indication bit is zero, then the receiver calculates the logarithm likelihood ratio (LLR) of a received bit for each subcarrier based on the indicated MCS. On the other hand, if the DCM indication bit is equal to one, then the receiver calculates the LLR by performing LLR combining of the upper subcarrier and the lower subcarrier of the resource unit. Various embodiments of such transmitting device and receiving device are now described below with accompany drawings.

Figure 3:
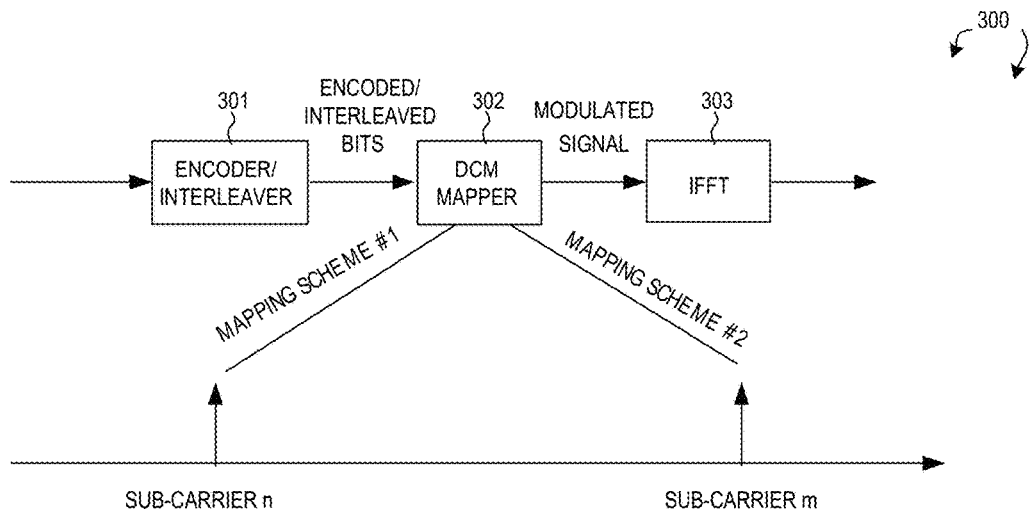
FIG. 3 is a simplified diagram of a transmitting device that applies dual carrier modulation (DCM).

FIG. 3 is a simplified diagram of a transmitting device 300 that applies DCM modulation. The encoded and interleaved bits of a RU output from encoder/interleaver 301 is fed into DCM constellation mapper 302. Encoder 301 may be an LDPC encoder or a BCC encoder with BCC interleaver. DCM constellation mapper 302 modulates the same encoded bits on two separate sub-carriers with possibly different mapping schemes. For example, as shown in FIG. 3, subcarrier n and subcarrier m carry the same bit information. Subcarrier n is the lower subcarrier and is applied with mapping scheme #1, subcarrier m is the upper subcarrier and is applied with mapping scheme #2. The modulated signals are then mapped onto data subcarriers of an RU and then fed into IFFT 303 and to be transmitted. In general, the two frequency subcarriers used for DCM can be pre-determined. For example, to maximize the frequency diversity, if n is the subcarrier k, then m is the subcarrier k+(N/2), where N is the total number of subcarriers in one OFDM symbol or RU to be used for data transmission.

Figure 4:
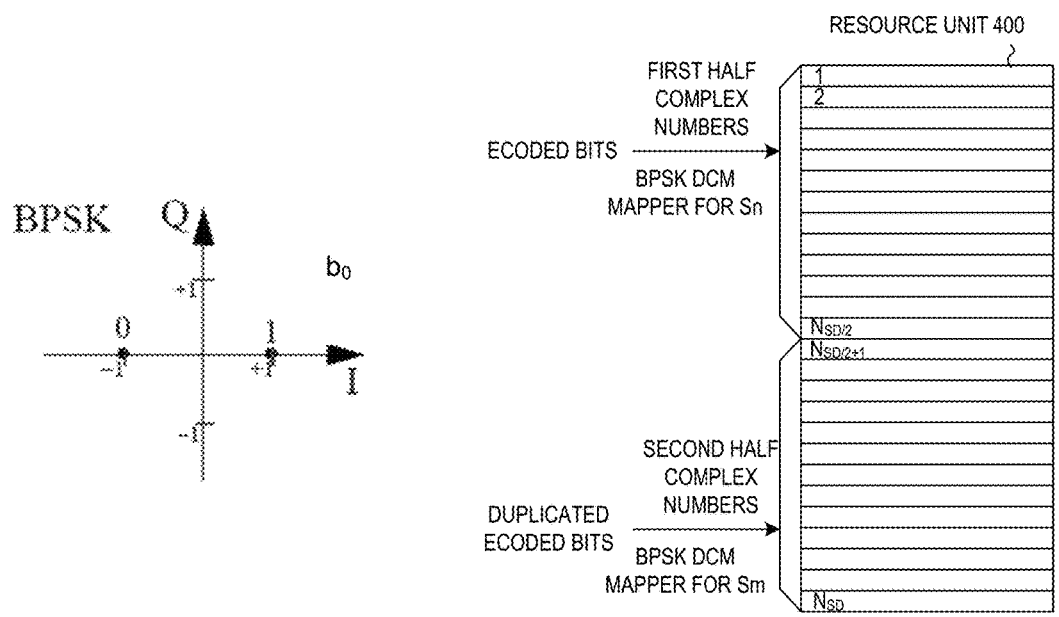
FIG. 4 illustrates one example of modulation mapping scheme for BPSK DCM that reduces peak to average power ratio (PAPR).

FIG. 4 illustrates one example of modulation mapping scheme for binary phase shift keying (BPSK) with DCM that reduces the peak to average power ratio (PAPR). Assume the modulated signals for subcarrier n and subcarrier m are denoted as $s_n$ and $s_m$, respectively. For BPSK with DCM, $s_n$ and $s_m$ can be obtained by mapping 1-bit encoded bit $b_0$ on two identical or different BPSK constellation. In accordance with one novel aspect, the modulated symbols $s_n$ and $s_m$ are obtained by mapping the 1-bit encoded bit $b_0$ using BPSK mapping scheme #1, and BPSK mapping scheme #2, respectively. BPSK scheme #1 and BPSK scheme #2 are selected such that $s_m = \pm(s_n)$ For example, the BPSK DCM mapping schemes can be:

$$s_n = 1 - 2b_0 \quad (1)$$

$$s_m = (1 - 2b_0)e^{jm\pi} \quad (2)$$

In the example of FIG. 4, the same encoded bit streams are modulated and mapped by the DCM constellation mapper onto the lower subcarriers and the upper subcarriers of the resource unit RU 400, respectively. Let $N_{SD}$ be the number of data subcarriers in one resource Unit (RU). For the encoded bit stream, when DCM modulation is used, then the DCM constellation mappers are applied. For example, the encoded bits are modulated to first half of complex numbers and mapped to the lower half of the data subcarriers $[1, 2, \ldots N_{SD/2}]$ of the RU. The encoded bits are duplicated and modulated to second half of complex numbers and mapped to the upper half of the data subcarriers $[N_{SD/2+1}, N_{SD/2+1}, \ldots N_{SD}]$ of the RU.

In next generation WLAN systems that are based on upcoming IEEE 802.11ax standards, each station (STA) can transmit signals using one or more resource units (RU). The RU size can be 26, 52, 106, 242, 484, or 996 tones with tone spacing of about 78.1 kHz. The generated complex numbers will be mapped to data tones of the first half and the data tones of the second half of the frequency segments of the RU. The first half frequency segment of a RU contains tones 1 to $N_{SD}/2$, and the second half frequency segment of a RU contains tones $N_{SD}/2$ to tones $N_{SD}$, where $N_{SD}$ is the RU size.

In accordance with one novel aspect, the proposed DCM for BPSK modulation scheme reduces the PAPR of a data packet to be transmitted. It can be seen that from equations (1) and (2), $s_m$ is $s_n$ that is multiplied by +1 or −1, depending on the value of the subcarrier index m. If m is even, then $s_m = s_n$; if m is odd, then $s_m = -s_n$. Through this operation, the PAPR of the OFDM signal is significantly reduced. In general, the PAPR of a signal x(t) is defined as:

$$\text{PAPR} = \max[x(t)*\text{conj}(x(t))]/E[x(t)*\text{conj}(x(t))]$$

In one example, to calculate the PAPR of a data packet, the following steps are performed: 1) generate random binary data of 4 Kbytes in length; 2) modulate the data using an IEEE 802.11ax transmitter to produce a time series of complex samples. The time samples are sampled at 20 MHz; 3) the PAPR is a ratio of the max sample power divided by the average power. If the complex sequence is T and of length N then:

$$Pt = T*\text{conj}(T)\text{–the power of each sample}$$

$$\text{avg}Pt = \text{sum}(Pt)/N\text{–the average power}$$

$$\max Pt = \max(Pt)\text{–the maximum power}$$

$$\text{PAPR} = \max Pt/\text{avg}Pt$$

$$\text{PAPR(dB)} = 10*\log_{10}(\max Pt/\text{avg}Pt)$$

Figure 5:
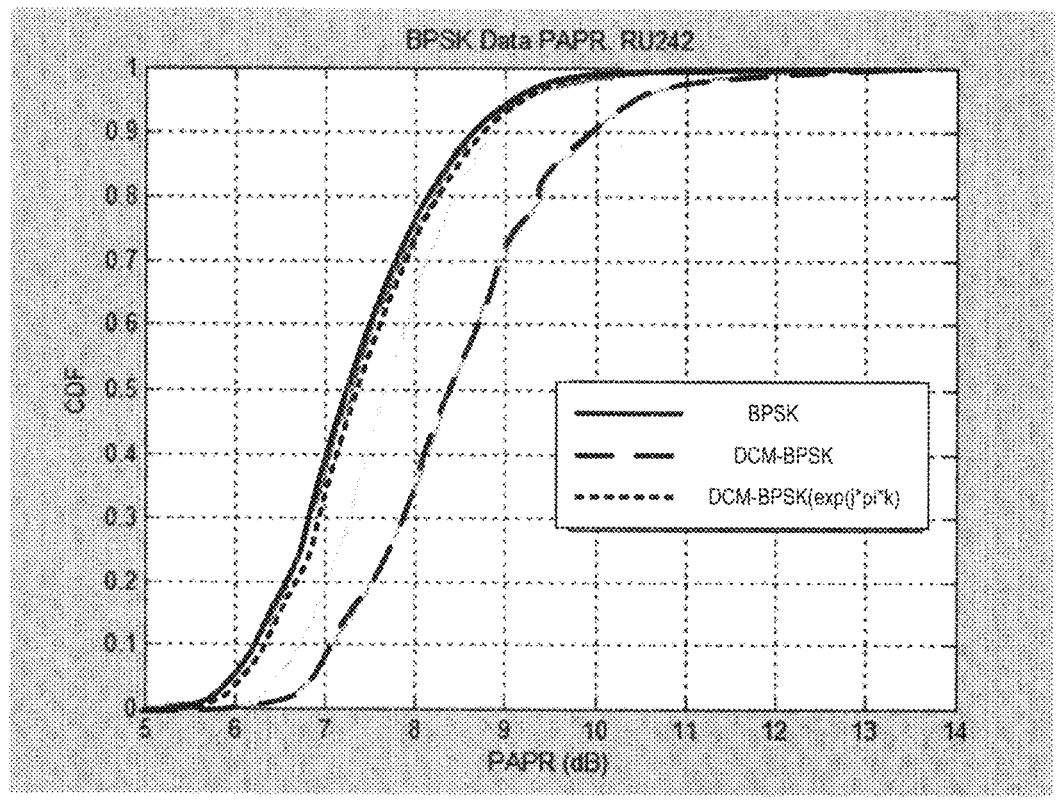
FIG. 5 illustrates examples of the cumulative distribution function (CDF) of PAPR corresponding to different BPSK modulation schemes.

FIG. 5 illustrates examples of the cumulative distribution function (CDF) of PAPR corresponding to different BPSK modulation schemes. Since PAPR varies from packet to packet, in the example of FIG. 5, the PAPR for 10,000 packets are computed and the CDFs of the PAPR corresponding to different modulation schemes are plotted. Three different modulation schemes are used. In a first modulation scheme, non-DCM BPSK is used; in a second modulation scheme, DCM BPSK with no special mapping is used; in a third modulation scheme, DCM BPSK with proposed special mapping is used.

For non-DCM BPSK modulation, as depicted by the solid curve, the average PAPR is about 7.25 dB. For DCM BPSK modulation, data is duplicated and modulated with no special mapping, e.g., the same BPSK mapping is used for the lower half of the subcarriers and the upper half of the subcarriers. As depicted by the dashed curve, the average PAPR is about 8.5 dB, which is higher than non-DCM BPSK modulation. For DCM BPSK with proposed special mapping, data is modulated with a first BPSK mapping scheme #1 for the lower half of the subcarriers, duplicated data is then modulated with a second BPSK mapping scheme #2 for the upper half of the subcarriers. As depicted by the dotted curve, the average PAPR is very close to non-DCM BPSK modulation scheme.

Figure 6:
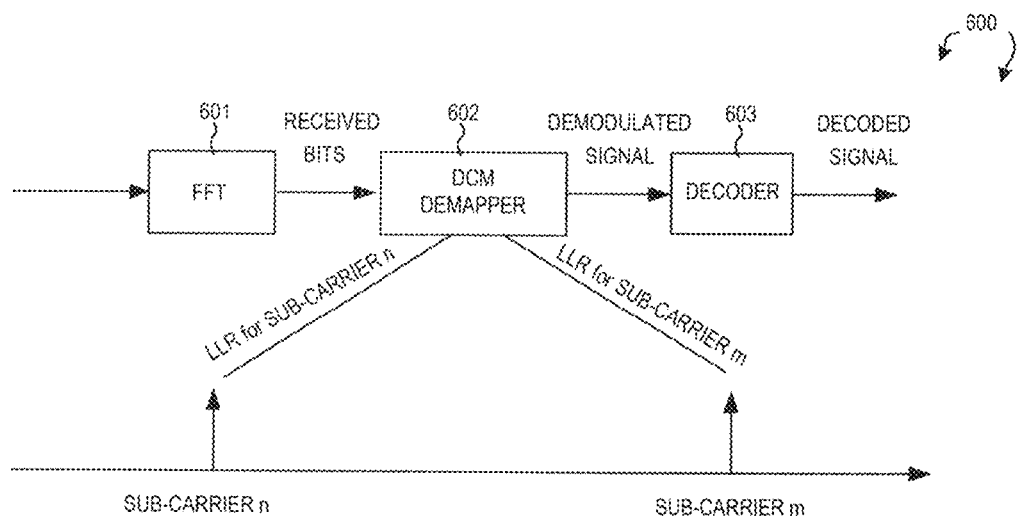
FIG. 6 is a simplified diagram of a receiving device that applies DCM de-modulation.

FIG. 6 is a simplified diagram of a receiving device 600 that applies DCM de-modulation with de-mapping. At the receiver, the received signal through FFT 601 can be written as:

$$r_n = h_n s_n + v_n \quad \text{Upper subcarrier}$$

$$r_m = h_m s_m + v_m \quad \text{Lower subcarrier}$$

Where $h_n$ and $h_m$ are channel response matrixes for subcarriers n and m $v_n$ and $v_m$ are modeled as AWGN noise The de-mapper/demodulator 602 of the receiver can calculate the logarithm likelihood ratio (LLR) of a received bit by combining the received signals from the upper subcarrier and the lower subcarrier if the SNR is considered "good" for the upper and lower subcarriers. Alternatively, the receiver can choose to calculate the LLR of a received bit just from the upper subcarrier or from the lower subcarrier if the SNR is considered "bad" for the lower or the upper subcarriers, respectively. The demodulated signal is then fed to decoder 603 for outputting the decoded signal.

Figure 7:
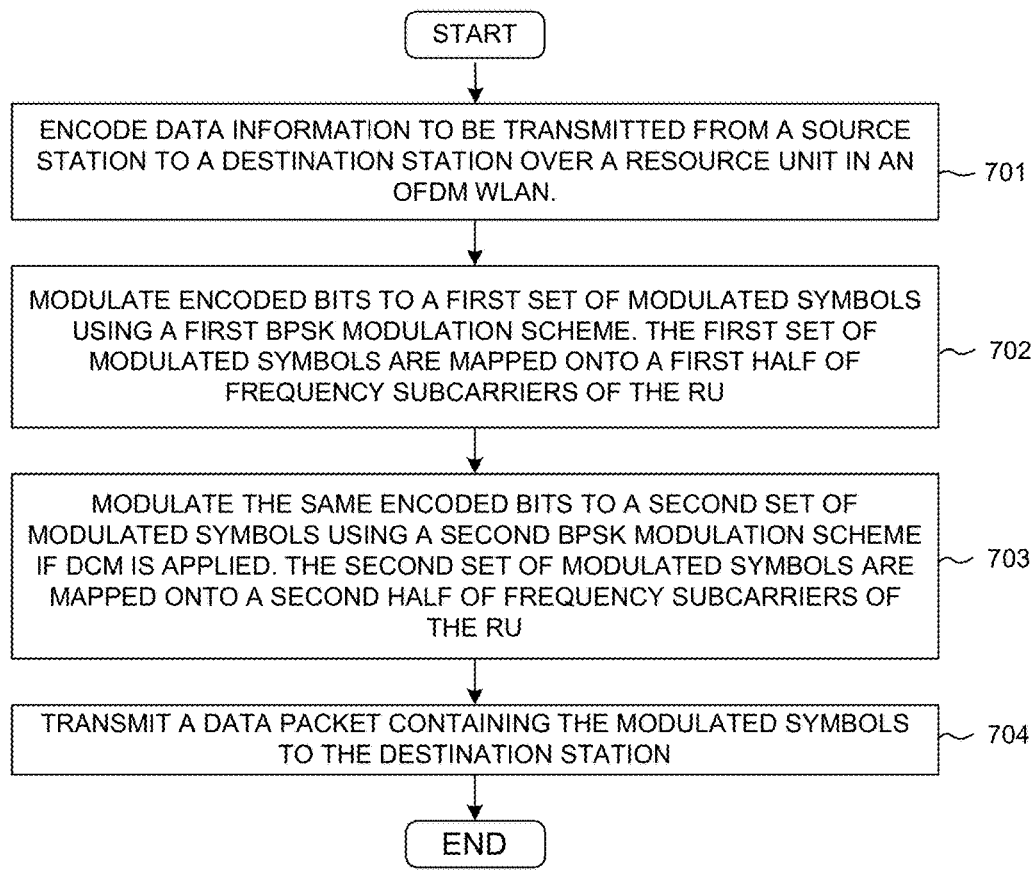
FIG. 7 is flow chart of a method of transmitting and encoding a HE PPDU frame with DCM and PAPR reduction in accordance with a novel aspect.

FIG. 7 is flow chart of a method of transmitting and encoding a HE PPDU frame with DCM and PAPR reduction in accordance with a novel aspect. In step 701, a wireless source station encodes data information to be transmitted from the source station to a destination station over a resource unit (RU) in an orthogonal frequency division multiplexing (OFDM) wireless local area network. In step 702, the source station modulates encoded bits to a first set of modulated symbols using a first binary phase shift keying (BPSK) modulation scheme, wherein the first set of modulated symbols is mapped onto a first half of frequency subcarriers of the RU. In step 703, the source station modulates the same encoded bits to a second set of modulated symbols using a second BPSK modulation scheme if dual carrier modulation (DCM) is applied, wherein the second set of modulated symbols is mapped onto a second half of frequency subcarriers of the RU. In step 704, the source station transmits a data packet containing the modulated symbols to the destination station. In one example, the first set of modulated symbols is represented by $s_n$ and the second set of modulated symbols is represented by $s_m$, where n and m are subcarrier indices, and $s_m = s_n * e^{j*(pi)*m}$.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   encoding data information to be transmitted from a source station to a destination station over a resource unit (RU) in an orthogonal frequency division multiplexing (OFDM) wireless local area network;
   modulating encoded bits to a first set of modulated symbols using a first binary phase-shift keying (BPSK) modulation scheme, wherein the first set of modulated symbols is mapped onto a first half of frequency subcarriers of the RU;
   modulating the encoded bits to a second set of modulated symbols using a second BPSK modulation scheme provided dual carrier modulation (DCM) is applied, wherein the second set of modulated symbols is mapped onto a second half of frequency subcarriers of the RU; and
   transmitting a data packet to the destination station, wherein the data packet comprises the first set of modulated symbols and also comprises the second set of modulated symbols provided the DCM is applied.

2. The method of claim 1, wherein the second set of modulated symbols is equal to the first set of modulated symbols multiplied by +1 or −1.

3. The method of claim 1, wherein the first set of modulated symbols is $s_n$ for subcarrier n, wherein further the second set of modulated symbols is $s_m$ for subcarrier m, and wherein $s_m = s_n * e^{j*(pi)*m}$, n and m are subcarrier indexes.

4. The method of claim 1, wherein the first BPSK modulation scheme and the second BPSK modulation scheme are selected to achieve a first peak to average power ratio (PAPR).

5. The method of claim 4, wherein a second PAPR is achieved if no DCM is applied, and wherein the second PAPR is substantially equal to the first PAPR.

6. The method of claim 4, wherein a second PAPR is achieved if the first BPSK modulation scheme and the second BPSK modulation scheme are equal, and wherein the second PAPR is higher than the first PAPR.

7. The method of claim 1, wherein the encoding comprises using a low-density parity check (LDPC) channel control coding.

8. The method of claim 1, wherein the encoding comprises using a binary convolutional code (BCC) encoder followed by a BCC interleaver.

9. A wireless station comprising:
   an encoder operable to encodes data information to be transmitted from a source station to a destination station over a resource unit (RU) in an orthogonal frequency division multiplexing (OFDM) wireless local area network;
   a modulator operable to modulates encoded bits to a first set of modulated symbols using a first binary phase-shift keying (BPSK) modulation scheme, wherein the first set of modulated symbols is mapped onto a first half of frequency subcarriers of the RU;
   wherein the modulator is also operable to modulate the encoded bits to a second set of modulated symbols using a second BPSK modulation scheme if dual carrier modulation (DCM) is applied, wherein the second set of modulated symbols is mapped onto a second half of frequency subcarriers of the RU; and
   a transmitter operable to transmits a data packet to the destination station, wherein the data packet comprises the first set of modulated symbols and also comprises the second set of modulated symbols provided the DCM is applied.

10. The wireless station of claim 9, wherein the second set of modulated symbols is equal to the first set of modulated symbols multiplied by +1 or −1.

11. The wireless station of claim 9, wherein the first set of modulated symbols is $s_n$ for subcarrier n, wherein further the second set of modulated symbols is $s_m$ for subcarrier m, and wherein $s_m = s_n * e^{j*(pi)*m}$, n and m are subcarrier indexes.

12. The wireless station of claim 9, wherein the first BPSK modulation scheme and the second BPSK modulation scheme are selected to achieve a first peak to average power ratio (PAPR).

13. The wireless station of claim 12, wherein a second PAPR is achieved if no DCM is applied, and wherein the second PAPR is substantially equal to the first PAPR.

14. The wireless station of claim 12, wherein a second PAPR is achieved if the first BPSK modulation scheme and the second BPSK modulation scheme are equal, and wherein the second PAPR is higher than the first PAPR.

15. The wireless station of claim 9, wherein the encoder comprises a low-density parity check (LDPC) channel control encoder.

16. The wireless station of claim 9, wherein the encoder comprises a binary convolutional code (BCC) followed by a BCC interleaver.

* * * * *